Patented July 22, 1947

2,424,493

UNITED STATES PATENT OFFICE 2,424,493

PYRAZOLONE MONOAZO DYES CONTAINING POLYBASIC ACID ESTERS OF ALKYLENE SULFONES

Willy Müller, Basel, and Jakob Scheidegger, Bottmingen, Switzerland, assignors to Society of Chemical Industry in Basle, Basel, Switzerland, a Swiss firm No Drawing. Application July 28, 1944, Serial No. 547,098. In Switzerland September 2, 1943

6 Claims. (Cl. 260—163)

The present invention is based on the observation that the dyestuffs of the general formula

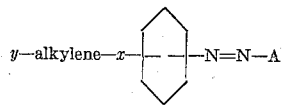

wherein $x$ stands for an $-SO_2-$ group or a

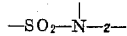

group ($z=$hydrogen or alkyl), $y$ stands for the radical of a polybasic acid linked in the form of an acid ester and A stands for the radical of a yellow component, are valuable products. In this formula alkylene and alkyl stand for lower alkylene or alkyl radicals, i. e. radicals in which not more than six carbon atoms are linked directly with one another, the alkylene radical and also the alkyl radical being capable of carrying substituents. Particularly valuable dyestuffs are those wherein $x$ is the $-SO_2-$ group and A is the radical of a 5-pyrazolone compound.

The dyestuffs are produced according to methods usual for such products.

Thus dyestuffs of the general formula

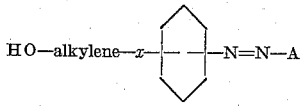

wherein $x$ and A have the above given significance, are treated with polybasic acids or their anhydrides, halides or reactive esters in such a manner that the latter form an ester-like linkage with the hydroxyl group, one acid group possessing salt-forming properties being introduced into the molecule.

Aromatic amines of the formula

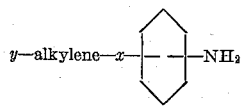

wherein $x$ and $y$ have the above given significance, may also be diazotized and caused to react with so-called yellow components, i. e. compounds which, owing for example to the presence of a hydroxyl group or of a keto group capable of being enolized, are themselves capable of coupling with diazo compounds with formation of yellow dyestuffs. The dyestuffs thus obtained contain an acid ester group and are consequently soluble in water, especially in the form of their salts, yellow solutions being formed. They are capable of dyeing esters and ethers of cellulose yellow shades. They are also suitable for dyeing various artificial masses, especially nitro lacquers, further also artificial fibers of superpolyamides or superpolyurethanes. Depending on the choice of the starting materials, these dyestuffs can also be used for dyeing animal fibers, such as wool and silk.

The importance of the process and of the products of the present invention resides mainly in the fact that the products are yellow dyestuffs which have the property of dyeing ethers and esters of cellulose from an aqueous solution fast yellow shades which are non-phototropic.

The following diazotizing components can be used for producing the parent dyestuffs of the general formula

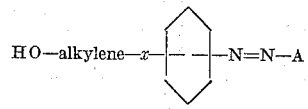

(1) 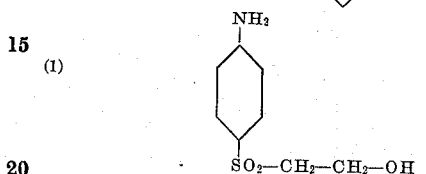

(2) 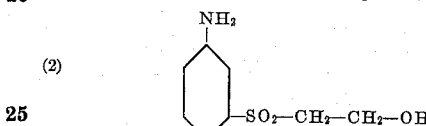

(3) 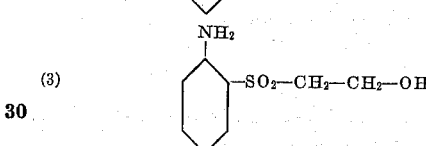

(4) 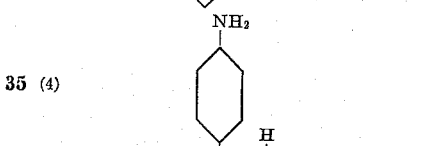

(5) 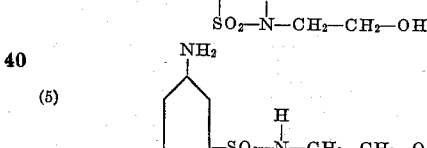

(6) 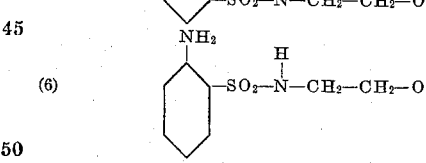

Compounds of the type of Formulas 1 to 3 can be produced either by converting the halides of the sulfonic acids, e. g. of acetanilide, according to usual methods into the sulfinic acids, whereupon their alkali salts are converted into the hydroxyalkylsulfones with ethylene halogenhydrins, such as glycerine chlorohydrin, butylene chlorohydrin etc., the amino group being subsequently liberated by saponification, or by causing the mercaptans of the nitrobenzene to react with ethylene halogenhydrines, oxidizing these thioethers to form sulfones and reducing the aromatic nitro group to the amino group. The sulfamides of the Formulas 4 to 6 can be produced advantageously from the sulfohalides of the corresponding nitrobenzenes or acetanilides by reaction with ethanolamines and subsequent reduction or saponification.

These compounds are therefore diazotized and coupled with the yellow component, whereupon esterification of the aliphatically bound hydroxyl group of the diazotizing component is effected.

Instead of the hydroxylated sulfones or sulfamides there can also be used their esters with polybasic acids as diazotizing components. Both cases therefore involve acid esters, for example of the following acids: sulfuric acid, oxalic acid, malonic acid, succinic acid, adipinic acid, pimelic acid, suberic acid, maleic acid, phthalic acid, sulfobenzoic acid, sulfophthalic acid, sulfosuccinic acid, sulfoacetic acid, chlorosulfoacetic acid. When starting from esterified diazotizing components, it is of course not necessary to esterify the coupling products.

The diazo compounds may obviously contain further nuclear substituents besides the sulfone- or sulfonamide-group, for example, halogen atoms, alkyl groups, alkoxy groups, nitro groups, and so forth.

As coupling components, i. e. in this case as yellow components, there can be used: phenols, such as phenol and especially the phenols coupling in ortho-position to the hydroxyl group, e. g. para-cresol, resorcin, hydroquinonemonoalkylether, further dihydroxyquinolines, esters and amides of acetoacetic acid, moreover especially 5-pyrazolones, such as for example 1-phenyl-3-methyl-5-pyrazolone, 1-tolyl-3-methyl-5-pyrazolones, 1-chlorophenyl-3-methyl-5-pyrazolones, especially 1-ortho-chlorophenyl-3-methyl-5-pyrazoline, further also pyrazolone carboxylic acids and pyrazolone sulfonic acids, further 3-methyl-5-pyrazolone; finally compounds such as α-methylketol.

The following examples illustrate the invention, but are not to be regarded as limiting it in any way, the parts being by weight:

*Example 1*

20.1 parts of 1-aminobenzene-4-β-hydroxyethylsulfone (obtained by reduction of 1-acetaminobenzene-4-sulfochloride with sodium sulfite in a weakly alkaline solution, causing the resulting sulfinic acid salt to react with ethylene chlorohydrin and splitting off the acetyl group with hydrochloric acid of 20 per cent. strength) are dissolved with 25 parts of hydrochloric acid of 30 per cent. strength in 50 parts of water and diazotized at 5–10° C. with 25 parts of 4N-sodium nitrite solution. The clear, yellow-orange colored diazo solution is allowed to flow, at 5–10° C., into a solution of 21 parts of ortho-chlorophenylmethylpyrazolone, 15 parts of caustic soda solution of 30 per cent. strength and 25 parts of sodium carbonate in 200 parts of water. In order to complete coupling, the whole is stirred for 6 hours at 15–20° C., the insoluble dyestuff which has formed is suction-filtered, washed with 200 parts of water and dried.

20 parts of the dyestuff thus obtained are introduced at 0–5° C. into 100 parts of sulfuric acid of 60° Bé. After a short time, the dyestuff is dissolved to a yellow solution. This is stirred for a further hour at room temperature, then poured onto 250 parts of ice, filtered off, and the filter residue is dissolved with the necessary quantity of sodium carbonate in 200 parts of water at 20–30° C. 35–40 parts of sodium chloride are added to the clear solution and stirring is continued until the dyestuff has completely precipitated. The dyestuff is suction-filtered, washed with dilute sodium chloride solution and dried in a vacuum at 50–55° C.

A brown-yellow powder is thus obtained which dissolves in water to a clear solution and dyes acetate rayon powerful greenish yellow shades having excellent fastness properties. It corresponds in the free state to the formula

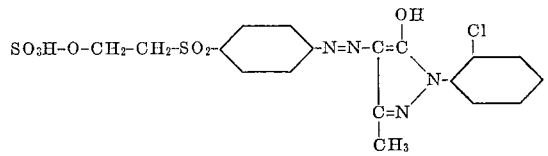

The same dyestuff is obtained by first converting para-aminobenzene-β-hydroxyethylsulfone into the ester with sulfuric acid, then diazotizing this ester and coupling it with ortho-chlorophenylmethylpyrazolone.

*Example 2*

20.1 parts of aminobenzene-4-β-hydroxyethylsulfone are diazotized as indicated in Example 1 and the diazo solution is added at 5° C. to a solution of 10.8 parts of para-cresol, 15 parts of caustic soda solution of 30 per cent. strength and 25 parts of sodium carbonate in 200 parts of water. The resulting dyestuff corresponding in the free state to the formula

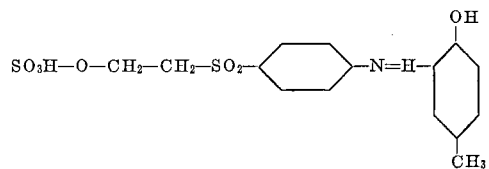

is worked up as described in Example 1 and converted into the sulfuric acid ester.

A brown powder is thus obtained which dissolves readily in water to a yellow red solution and dyes acetate rayon from an aqueous solution powerful reddish yellow shades possessing good fastness properties.

*Example 3*

42.0 parts of the water-insoluble dyestuff obtained according to Example 1 are dissolved in 250 parts of glacial acetic acid and 12.5 parts of succinic acid anhydride are added to this solution at 60–70° C. The whole is heated for 2 hours to 100–110° C., allowed to cool and then poured into 500 parts of ice water.

The precipitated dyestuff which corresponds in the free state to the formula

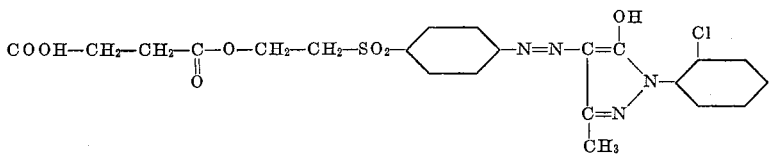

is filtered off, washed with water and the filter residue is dissolved in 400 parts of water with the necessary quantity of sodium carbonate. The dyestuff is salted out by addition of 50 parts of sodium chloride, filtered and dried in a vacuum at 50° C.

There is obtained a yellow powder which dissolves in water to a yellow solution and dyes acetate rayon from aqueous solutions pure yellow shades having good fastness properties.

As solvents for the esterification there can also be used other suitable solvents, besides glacial acetic acid, such as toluene, benzene, xylene and the like.

*Example 4*

0.5 part of the dyestuff of Example 1 is dissolved in 3000 parts of water. 40 parts of crystallized sodium sulfate are added to this solution and 100 parts of acetate rayon yarn are treated therein for 1 hour at 80° C. After rinsing and drying there is obtained an acetate rayon which is dyed pure yellow shades.

In the following are given the formulae of some typical representatives of these dyestuffs:

(1) 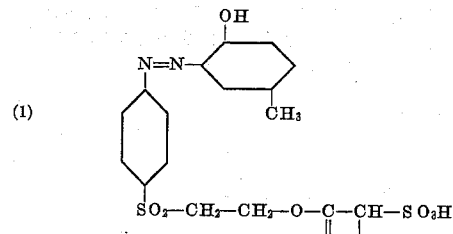

(2) 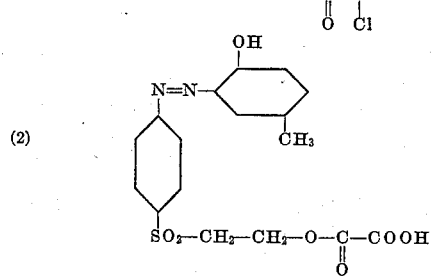

(3) 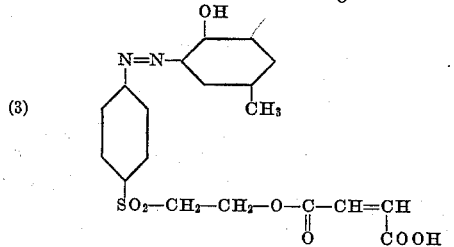

(4) 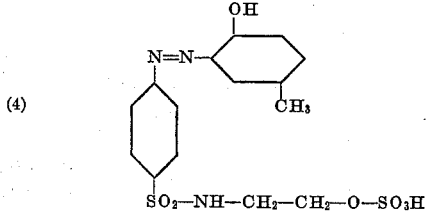

(5) 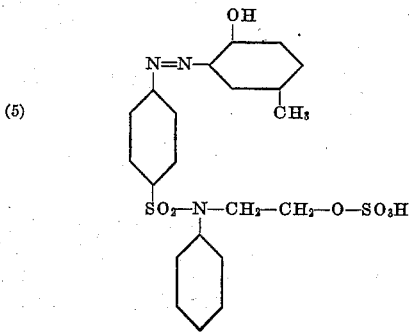

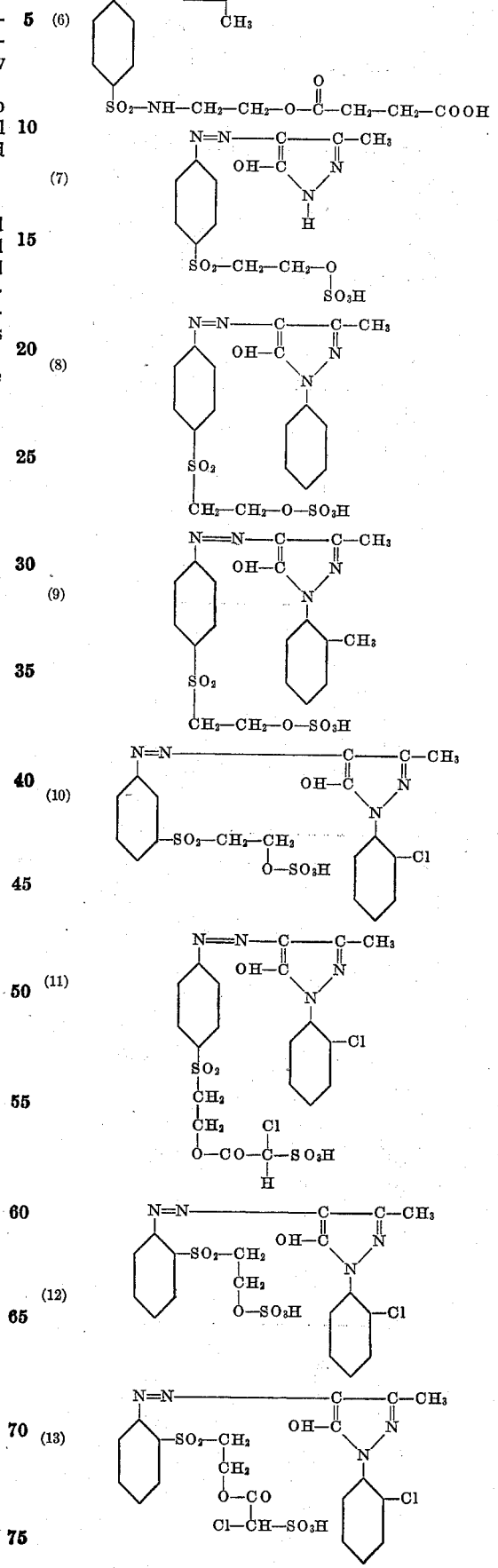

(14) 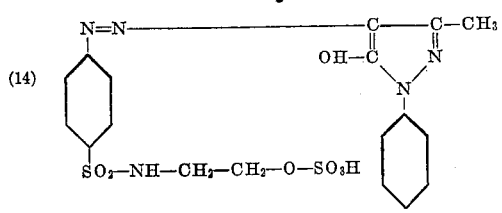

(15) 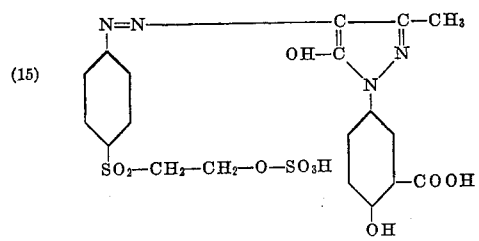

(16) 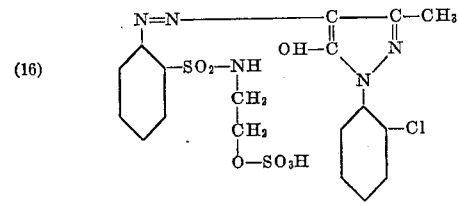

(17) 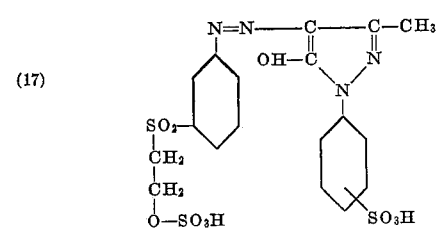

(18) 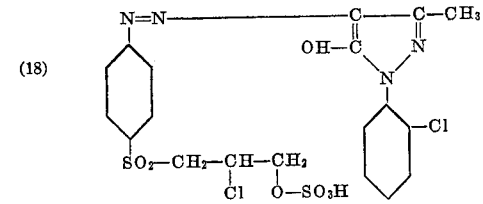

(19) 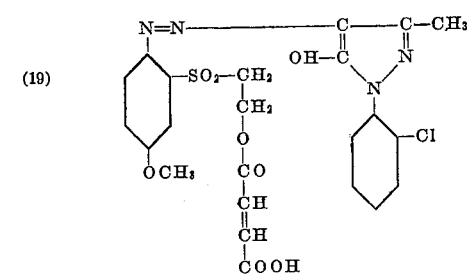

(20) 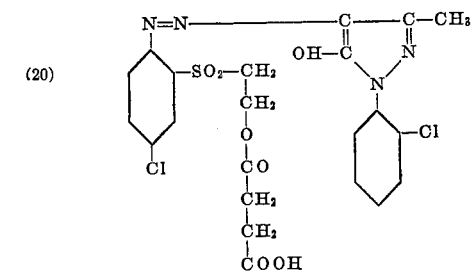

(21) 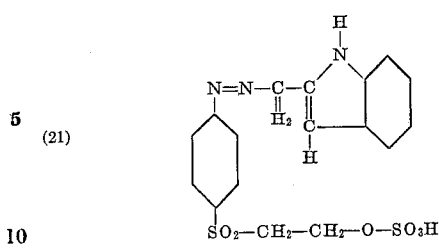

What we claim is:

1. The new dyestuffs corresponding in the free form to the general formula

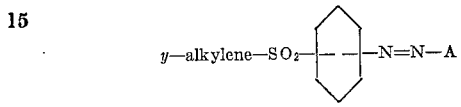

wherein the alkylene radical consists at the most of 6 carbon atoms, $y$ stands for the radical of a polybasic acid linked in the form of an acid ester and A stands for the radical of a 5-pyrazolone compound, which dyestuffs in the form of their alkali salts are water-soluble powders dissolving in water to yellow solutions.

2. The new dyestuffs corresponding in the free form to the general formula

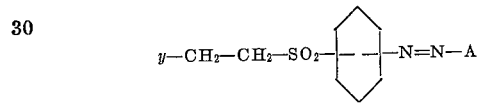

wherein $y$ stands for the radical of a polybasic acid linked in the form of an acid ester and A stands for the radical of a 5-pyrazolone compound, which dyestuffs in the form of their alkali salts are water-soluble powders dissolving in water to yellow solutions.

3. The new dyestuffs corresponding in the free form to the general formula

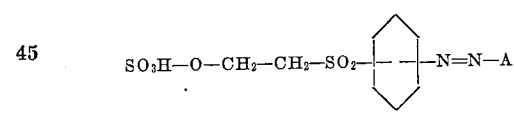

wherein A stands for the radical of a 5-pyrazolone compound, which dyestuffs in the form of their alkali salts are water-soluble powders dissolving in water to yellow solutions.

4. The new dyestuffs corresponding in the free form to the general formula

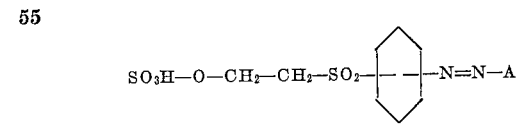

wherein A stands for the radical of a 1-phenyl-3-methyl-5-pyrazolone compound, which dyestuffs in the form of their alkali salts are water-soluble powders dissolving in water to yellow solutions.

5. The new dyestuff corresponding in the free form to the general formula

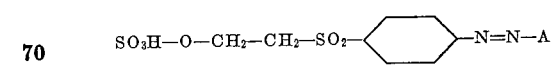

wherein A stands for the radical of a 1-phenyl-3-methyl-5-pyrazolone compound, which dyestuffs in the form of their alkali salts are water-soluble powders dissolving in water to yellow solutions.

6. The dyestuff of the formula
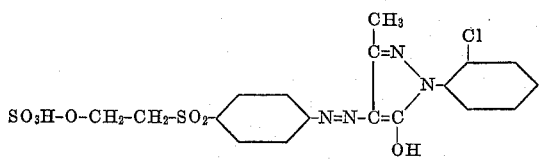
WILLY MÜLLER.
JAKOB SCHEIDEGGER.
REFERENCES CITED
The following references are of record in the file of this patent:
UNITED STATES PATENTS
| Number | Name | Date |
|---|---|---|
| 2,274,717 | Lyford | Mar. 3, 1942 |
| 2,019,844 | Clingestein et al. | Nov. 5, 1935 |
| 2,238,486 | Dickey et al. | Apr. 15, 1941 |
| 2,309,176 | Dreyfus | Jan. 26, 1943 |
| 2,157,725 | Zerweck et al. | May 9, 1939 |
| 1,483,084 | Green et al. | Feb. 12, 1924 |
FOREIGN PATENTS
| Number | Country | Date |
|---|---|---|
| 543,567 | Great Britain | Mar. 4, 1942 |

Certificate of Correction

Patent No. 2,424,493.  July 22, 1947.

WILLY MÜLLER ET AL.

It is hereby certified that errors appear in the printed specification of the above numbered patent requiring correction as follows: Column 3, line 41, for the syllable "razoline" read *razolone*; column 4, line 45, Example 2, for that portion of the formula reading "N=H—" read *N=N—*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*